US010038879B2

(12) United States Patent
Namgung (10) Patent No.: US 10,038,879 B2
(45) Date of Patent: Jul. 31, 2018

(54) BI-DIRECTIONAL VIRTUAL REALITY SYSTEM (71) Applicant: HAEDENBRIDGE CO., LTD., Seoul (KR)

(72) Inventor: Hwan Sik Namgung, Seoul (KR)

(73) Assignee: HAEDENBRIDGE CO., LTD., Seoul (KR)

(*) Notice: Subject to any disclaimer, the term of this patent is extended or adjusted under 35 U.S.C. 154(b) by 0 days.

(21) Appl. No.: 15/561,031

(22) PCT Filed: Jan. 15, 2016

(86) PCT No.: PCT/KR2016/000456
§ 371 (c)(1),
(2) Date: Sep. 22, 2017

(87) PCT Pub. No.: WO2016/153161
PCT Pub. Date: Sep. 29, 2016

(65) Prior Publication Data
US 2018/0063483 A1 Mar. 1, 2018

(30) Foreign Application Priority Data

Mar. 24, 2015 (KR) .................... 10-2015-0040508
May 7, 2015 (KR) .................... 10-2015-0063546

(51) Int. Cl.
H04N 7/15 (2006.01)
H04N 13/02 (2006.01)
(Continued)

(52) U.S. Cl.
CPC ......... H04N 7/152 (2013.01); H04N 13/0271 (2013.01); H04N 13/0456 (2013.01); H04L 65/403 (2013.01); H04N 2013/0461 (2013.01)

(58) Field of Classification Search
CPC ............ H04L 65/403; H04N 13/0271; H04N 13/0456; H04N 2013/0461; H04N 7/152
See application file for complete search history.

(56) References Cited

U.S. PATENT DOCUMENTS

2009/0254839 A1* 10/2009 Kripalani ............ G06F 3/0231
715/753
2013/0138786 A1* 5/2013 Ji ........................ H04L 65/1016
709/223

(Continued)

FOREIGN PATENT DOCUMENTS

KR    10-2003-0059782 A    7/2003
KR       10-0611680 B1      8/2006
(Continued)

Primary Examiner — Mohammad Islam
(74) Attorney, Agent, or Firm — IP Legal Services, LLC (57) ABSTRACT The present disclosure relates to a bi-directional VR (virtual reality) system and, more particularly, to a bi-directional VR system using a user image and a user voice extracted by a 3D depth camera, and media processed by synthesizing an interactive content image and sound.
A bi-directional VR system may include two or more terminals; and a mixing server configured to transmit mixed data generated by processing signals transmitted from the terminals to the respective terminals. At least one main terminal of the two or more terminals may include a 3D depth camera; a main body unit provided with a processor and a memory, and loaded with an operation program; at least two sound devices connected to the main body unit to be controlled by the main body unit, and provided with an audio output terminal and a microphone terminal; and at least two display units connected to the main body unit to be controlled by the main body unit.

13 Claims, 5 Drawing Sheets (51) Int. Cl.
  *H04L 29/06* (2006.01)
  *H04N 13/04* (2006.01)

(56) References Cited

U.S. PATENT DOCUMENTS

| | | | |
|---|---|---|---|
| 2014/0028788 A1 | 1/2014 | Halavy | |
| 2014/0184471 A1* | 7/2014 | Martynov | G06F 3/1423 |
| | | | 345/1.2 |
| 2015/0215581 A1* | 7/2015 | Barzuza | G06T 19/006 |
| | | | 348/14.1 |
| 2015/0348493 A1* | 12/2015 | Chae | G09G 5/00 |
| | | | 345/212 |
| 2016/0012612 A1* | 1/2016 | Koga | G06F 3/14 |
| | | | 345/633 |
| 2016/0286168 A1 | 9/2016 | Halavy | |
| 2017/0019627 A1* | 1/2017 | Wan | H04N 7/144 |
| 2017/0237789 A1* | 8/2017 | Harner | G06F 3/011 |
| | | | 709/205 |
| 2017/0365102 A1* | 12/2017 | Huston | G06T 19/006 |
| 2018/0020180 A1* | 1/2018 | Park | H04N 5/445 |

FOREIGN PATENT DOCUMENTS

| | | |
|---|---|---|
| KR | 10-2009-0028674 A | 3/2009 |
| KR | 10-2011-0040046 A | 4/2011 |
| KR | 10-1099369 B1 | 12/2011 |
| KR | 10-2014-0016154 A | 2/2014 |
| KR | 10-2014-0098573 A | 8/2014 |

\* cited by examiner

BI-DIRECTIONAL VIRTUAL REALITY SYSTEM

CROSS REFERENCE TO RELATED APPLICATIONS

This application is a National Stage Patent Application of PCT International Patent Application No. PCT/KR2016/000456 (filed on Jan. 15, 2016) under 35 U.S.C. § 371, which claims priority to Korean Patent Application Nos. 10-2015-0040508 (filed on Mar. 24, 2015) and 10-2015-0063546 (filed on May 7, 2015), the teachings of which are incorporated herein in their entireties by reference.

TECHNICAL FIELD

The present disclosure relates to a bi-directional VR (virtual reality) system. More particularly, the present disclosure relates to a bi-directional VR system using a user image and a user voice extracted by a 3D depth camera, and media processed by synthesizing an interactive content image and sound.

BACKGROUND ART

In the case of conventional video conferencing, functional supports such as H.239, BFCP (Binary Floor Control Protocol), and the like are required so as to share a content between remote places, such that the conventional video conferencing has a major drawback in that a conferencing participant using a terminal which does not support a content-sharing function can not participate therein. More specifically, it is because that the aforementioned method is based upon a dual-channel type where one channel configured for conveying a user image and a user voice and the other channel configured for conveying data to be shared are separated each other and are operated respectively.

Furthermore, in the case of some of the old fashioned codec equipment, PC images or other image sources are received through an external source connecting device, based on which a user image is synthesized and transmitted in PIP (Picture in Picture) mode. However, the method just described above results in an economic burden in that codec hardware equipment should be additionally provided. Additionally, a user may feel that the PIP image is old fashioned, that is to say the user may feel that the PIP image falls behind in technology, and further a simple image is applied as a background image, thereby causing a limit where users can not interact with each other, etc.

Additionally, in such a video call method using a 3D depth camera at an initial stage, a video conferencing terminal mounted with the 3D depth camera is configured to fill a background of an extracted image according to resolution (CIF, VGA, and the like) supported by the 3D depth camera, such that resolution of a background content becomes deteriorate due to the resolution limitations thereof, etc. As a result, the video call method mentioned hereinabove may have a limitation of being used, for example, for privacy protection purpose where a user may hide a user's surrounding, rather than sharing a background content with other users, and further may have problems that a sound of the background content can not be applied to the video call method and the background content can not be interacted with by other users.

PRIOR ART DOCUMENT

[Patent Document 1] Korean Patent Laid-Open Publication No. 10-2014-98573 entitled "DEVICE FOR PROVIDING VIDEO CONFERENCING SERVICE AND METHOD THEREFOR".

[Patent Document 2] Korean Patent Laid-Open Publication No. 10-2014-16154 entitled "METHOD FOR VIDEO CONFERENCING OF VARIOUS PARTICIPATING DEVICES AND SYSTEM THEREFOR".

SUMMARY OF THE INVENTION

Technical Problem

The present invention has been made in an effort to provide a bi-directional VR (Virtual Reality) system using a user image and a user voice extracted by a 3D depth camera, and media processed by synthesizing an interactive content image and sound, and further to provide the bi-directional VR system maximizing a sense of immersiveness, that is to say a sense of being there, of connected users by virtue of the same virtual space background.

Technical Solution

An exemplary embodiment of the present invention provides a bi-directional VR system, including: two or more terminals; and a mixing server configured to transmit mixed data generated by processing signals transmitted from the terminals to the respective terminals, wherein at least one main terminal of the two or more terminals may include: a 3D depth camera; a main body unit provided with a processor and a memory, and loaded with an operation program; at least two sound devices connected to the main body unit to be controlled by the main body unit, and provided with an audio output terminal and a microphone terminal; and at least two display units connected to the main body unit to be controlled by the main body unit, wherein the sound devices are configured in such a manner that an audio output terminal of a first sound device is connected to a first input terminal of a mixer device provided with a plurality of channels; a microphone terminal is connected to a second input terminal of the mixer device; and an output terminal of the mixer device is connected to a microphone terminal of a second sound device.

More specifically, the display units may be respectively configured in a manner that a first display unit displays wallpaper and a second display unit displays a virtual reality application program. Herein, the first display unit may be configured to display extracted data of a user image which is acquired through the 3D depth camera. The second display unit may be configured to display the mixed data.

Effects of the Invention

As described hereinabove, at least one embodiment according to the present invention has been made in an effort to transmit a compound document, a software program, a multimedia content, etc., all of which are selected by a user, together with a user image and a user voice extracted by a 3D depth camera and a content sound in a virtual space background at an internet broadcasting service or a video conferencing program, etc. regardless of whether or not a standard function for sharing a content is supported thereat, thereby having an effect of transmitting a high quality content to all of the participants at remote places.

Furthermore, according to another embodiment of the present invention, bi-directional virtual reality may be configured in a manner that a virtual space background content of a host called "a system administrator" is directly controlled by rest of the participants, thereby having an advantage of transmitting more vivid content to respective participants.

Additionally, when provided with a terminal (or device) of the present invention, all of the video conferencing participants may feel a high sense of realism, that is to say a sense of coexisting in the same space, by virtue of a mixing server, by which all of the video conferencing participants are processed to exist in the same space, thereby having an advantage not only of improving a video conferencing concentration level but also of acquiring a high value of user experience.

According to the embodiments of the present invention, it is advantageously possible not only to be applicable to video conferencing, bi-directional distance education, and entertainment requiring bi-directional event relays such as a cyber model house, and the like, but also to be applicable to various areas such as public sectors including a bi-directional seminar relay and disaster countermeasures, bi-directional home shopping, an internet broadcasting service, and the like.

EMBODIMENTS OF THE INVENTION

The present invention will be described more fully hereinafter with reference to the accompanying drawings, in which exemplary embodiments of the invention are shown.

Specifically structural or functional descriptions hereinafter disclosed in the specification are illustrated only for the purpose of describing the exemplary embodiments according to the present invention, and the exemplary embodiments according to the present invention may be modified in various different ways and should not be construed as being limited to the exemplary embodiments set forth herein.

As the exemplary embodiments of the present invention may be modified in various different ways and may have various modifications, the exemplary embodiments thereof will be illustrated on the drawings and will be described in detail in the specification. However, the exemplary embodiments of the present invention should not be limited to the specifically disclosed forms, and are intended to cover various modifications and equivalent arrangements, or substitutes included within the spirit and technology scope of the present invention.

The term "first" or "second" may be used to describe various components, but the components should not be limited by the above terms. The terms may be used only for the purpose of discriminating one component from another component, for example, a first component may be called a second component, and similarly, a second component may be called a first component without departing from the scope of the concept of the present invention.

It is to be understood that when one component is referred to as being "connected" or "coupled" to another component, it may be connected or coupled directly to the other component or be connected or coupled to the other component with a further component intervening therebetween. On the other hand, it is to be understood that when one component is referred to as being "connected or coupled directly" to another component, it may be connected to or coupled to the other component without another component intervening therebetween. Other expressions describing the relationships among the components such as "between" and "directly between" or "neighboring to" and "directly neighboring to" should be similarly interpreted.

The terms used in the specification are used to describe only specific embodiments and are not intended to limit the present invention. Singular forms are to include plural forms unless the context clearly indicates otherwise. It will be further understood that terms "comprises" or "have" used in the present specification specify the presence of stated features, numerals, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms have the same meaning as those that are understood by persons skilled in the art. It must be understood that the terms defined by the dictionary are identical with the meanings within the context of the related art, and they should not be ideally or excessively formally defined unless the context clearly dictates otherwise.

Hereinafter, embodiments of the present invention will be described in detail with reference to the accompanying drawings. The same reference numerals indicated in respective drawings will be employed as those for representing the same members.

Figure 1:
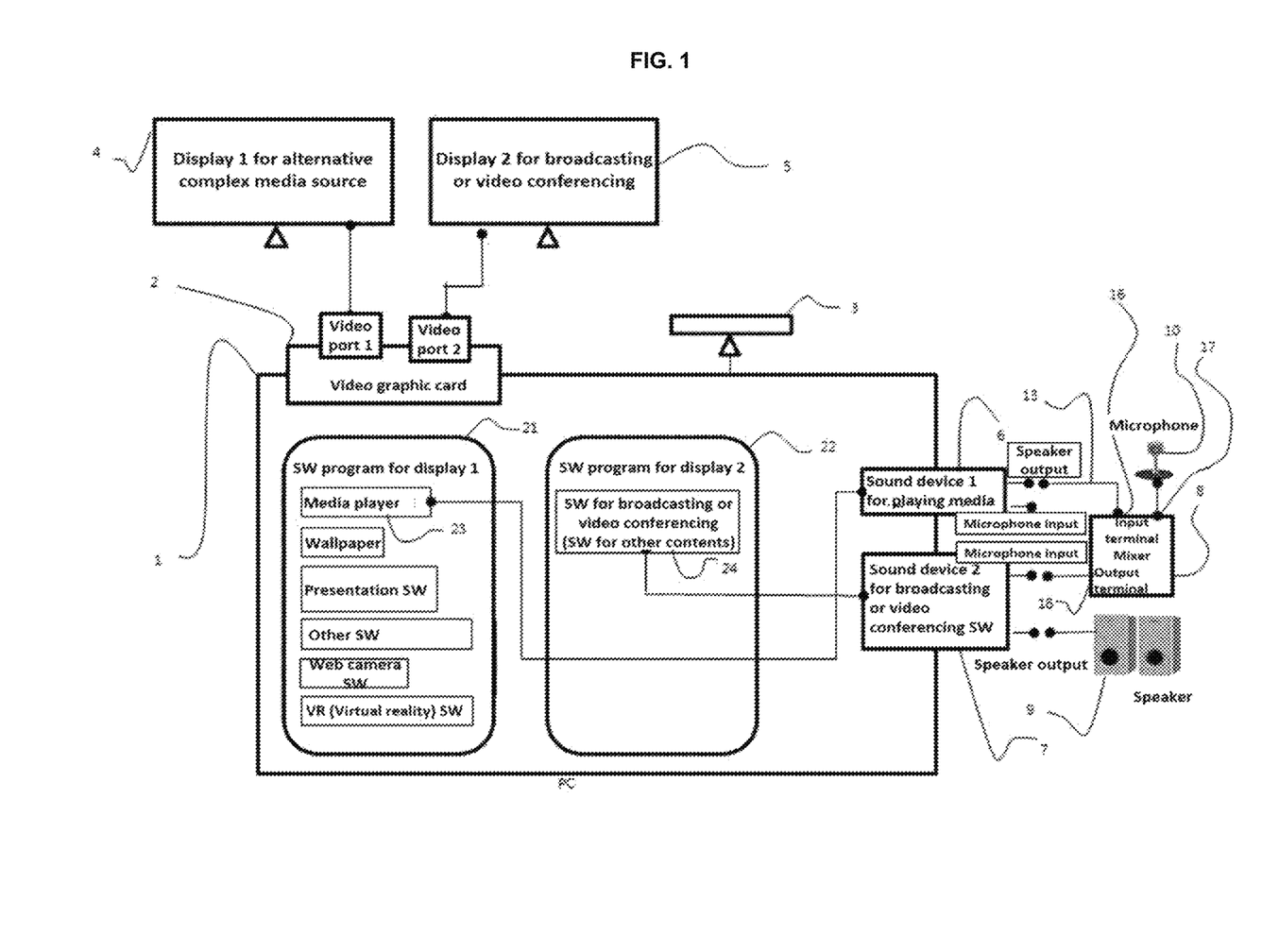
FIGS. 1 and 4 are drawings schematically illustrating configurations of a bi-directional VR system according to exemplary embodiments of the present invention.

FIG. 1 illustrates a configuration of a bi-directional VR system according to an exemplary embodiment of the present invention.

Referring to FIG. 1, a bi-directional VR system according to an exemplary embodiment of the present invention is provided with a main body 1, a video graphic card 2, a 3D depth camera 3, a first display unit 4, a second display unit 5, a first sound device 6, a second sound device 7, an audio mixer 8, a speaker 9, a microphone 10, and the like.

The main body 1 is a main component for the system configuration and may be configured by a PC, and the like. Furthermore, the main body 1 may be provided with a processor, a memory, and other IO devices (input/output device), and may load a plurality of pieces of application software including an OS (Operating System), such that operations of respective components connected to the main body 1 are controlled by the main body 1.

In at least one embodiment, the video graphic card 2 may be provided with two or more video output ports. In a case where two ports are provided thereto, one port may be used for providing default wallpaper, that is to say a default background image, and the other port may be used for providing a broadcasting service or a video conferencing program.

To this end, the displays may be configured to be connected therebetween by selecting "Extend these displays" in a multiple display option mode, such that the default wallpaper is configured to be positioned on the first display unit 4 and the broadcasting service or the video conferencing program is configured to be positioned on the second display unit 5 by virtue of a program for controlling an OS default screen of the main body 1.

An audio output terminal of the first sound device 6 is configured to be connected to a first input terminal 16 of the audio mixer 8 by using an audio cable, and the microphone 10 for transmitting a voice of a content transmitter is configured to be connected to a second input terminal 17 of the audio mixer 8. Accordingly, an audio output signal of the first sound device 6 and an audio signal received via the microphone 10 are able to be mixed, such that a content sound and a transmitter voice can be simultaneously transmitted.

To this end, as shown in FIG. 1, the first sound device 6 may be configured to play a sound of content (media) player software 23, and the second sound device 7 may be configured to play a sound of the broadcasting service or a video conferencing program 24.

In order to transmit the voice of the content transmitter together with an image thereof, an transmitter image extracted through the 3D depth camera 3 connected to the main body 1 can be displayed on an appropriate position of the first display unit 4, so that the transmitter image captured in real-time together with a background content of the first display unit 4 can be displayed as a media source, which is combined with mixed data composed of a voice and a background sound, through a broadcasting service of the second display unit 5 or the video conferencing program 24 thereof.

Figure 2:
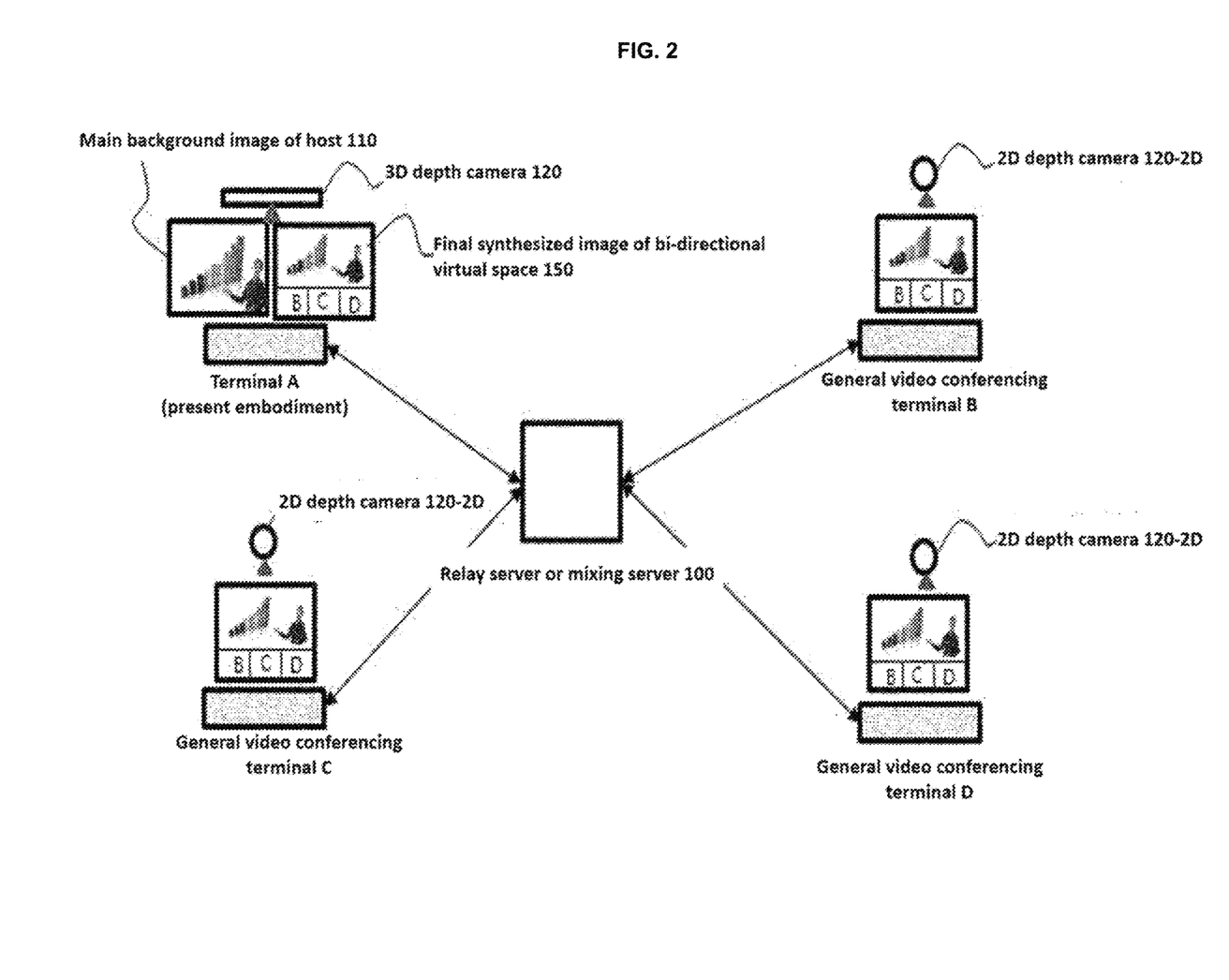
FIGS. 2, 3, and 5 are schematic diagrams describing various examples in a process of video conferencing using the bi-directional VR system of FIG. 1.

FIG. 2 illustrates an example in a process of video conferencing using a bi-directional VR system according to an exemplary embodiment of the present invention.

That is, FIG. 2 illustrates a case where a terminal (or device), to which a configuration of the bi-directional VR system according to an exemplary embodiment of the present invention is applied, is assigned as a main terminal A in video conferencing and other terminals B, C, and D mounted with a 2D camera participate in the same video conferencing. Hereinafter, an interactive content control process will be described in detail with respect to an image and voice data between the terminals provided with respectively different hardware configurations in FIG. 2.

First, resolution (first resolution) of a display 1 (110) provided to the terminal A is checked out. Next, an entire screen of the display 1 (110), on which an extracted transmitter image is displayed, is captured in real-time, after which the real-time captured image is encoded into second resolution selected as an own image source of the video conferencing and then is transmitted to a relay server or mixing server 100.

More specifically, the other terminals B, C, and D using the 2D camera capture and encode respective camera images, after which the encoded camera images are transmitted to the relay server or mixing server 100. Furthermore, the relay server or mixing server 100 receives images and voice data of the respective terminals, and then the images and voice data thereof are processed by steps of decoding, mixing, encoding, and the like, after which a final synthesized image of a bi-directional virtual space 150 is transmitted to respective connected terminals, or the respective images are relayed as they are without process steps of the decoding, the mixing, the encoding, and the like. Next, the respective terminals receive and decode the final synthesized image of the bi-directional virtual space 150, after which the decoded final synthesized image of the bi-directional virtual space 150 is respectively rendered in an appropriate position of each terminal, thereby making it possible to perform image communications.

In this case, any other conventional methods or means may be applicable as technologies for preventing voice howling and an echo sound, and detailed descriptions thereof will be omitted in this specification.

Also, after acquiring a control right, that is to say a right of managing the operation of the video conferencing, a user of the terminal A grants a control-sharing right to the connected terminal B arbitrarily selected amongst the connected users, that is to say the connected terminals. The connected terminal B, which is granted the control-sharing right, moves a mouse pointer, that is to say a mouse focus, on an area where an image of the terminal A is displayed, and generates an event by using devices such as a mouse, a keyboard, a pen mouse, and the like, all of which are capable of generating a similar pointer-event, after which the event is captured by the connected terminal B.

The connected terminal B is configured to convert a coordinate value of a mouse event, that is to say performs a coordinate conversion process, in order to correspond to image resolution (the second resolution) of the terminal A which is directly received from the terminal A or received via the relay server or mixing server 100 by which the image of the terminal A is relayed. It is because that the image of the terminal A of the second resolution may be rendered to a size different from a screen size of the connected terminal B.

Next, the connected terminal B is configured to transmit the converted coordinate value of the mouse event, a captured mouse event, and a keyboard event data to the terminal A or the relay server or mixing server 100. Afterwards, the terminal A checks whether or not received control data is correct, and when the received control data is correct, the terminal A converts the received coordinate value of the mouse event to adapt the resolution (first resolution) of the display 1 (110) and then focuses the converted coordinate value thereof on the display 1 (110), based on which the mouse event and/or the keyboard event are/is generated by the terminal A. Since respective resolution of the other terminals B, C, and D may be selectively encoded into resolution different from the resolution of the display 1, the process described hereinabove of converting the mouse coordinate value is required.

When a status change occurs at an interactive content of the display 1 (110) of the terminal A according to the corresponding event, all of the other connected terminals C and D including the connected terminal B, which is granted the control-sharing right, are able to make sure that a background content of the terminal A, which is generated by the connected terminal B, is being changed in real-time.

Figure 3:
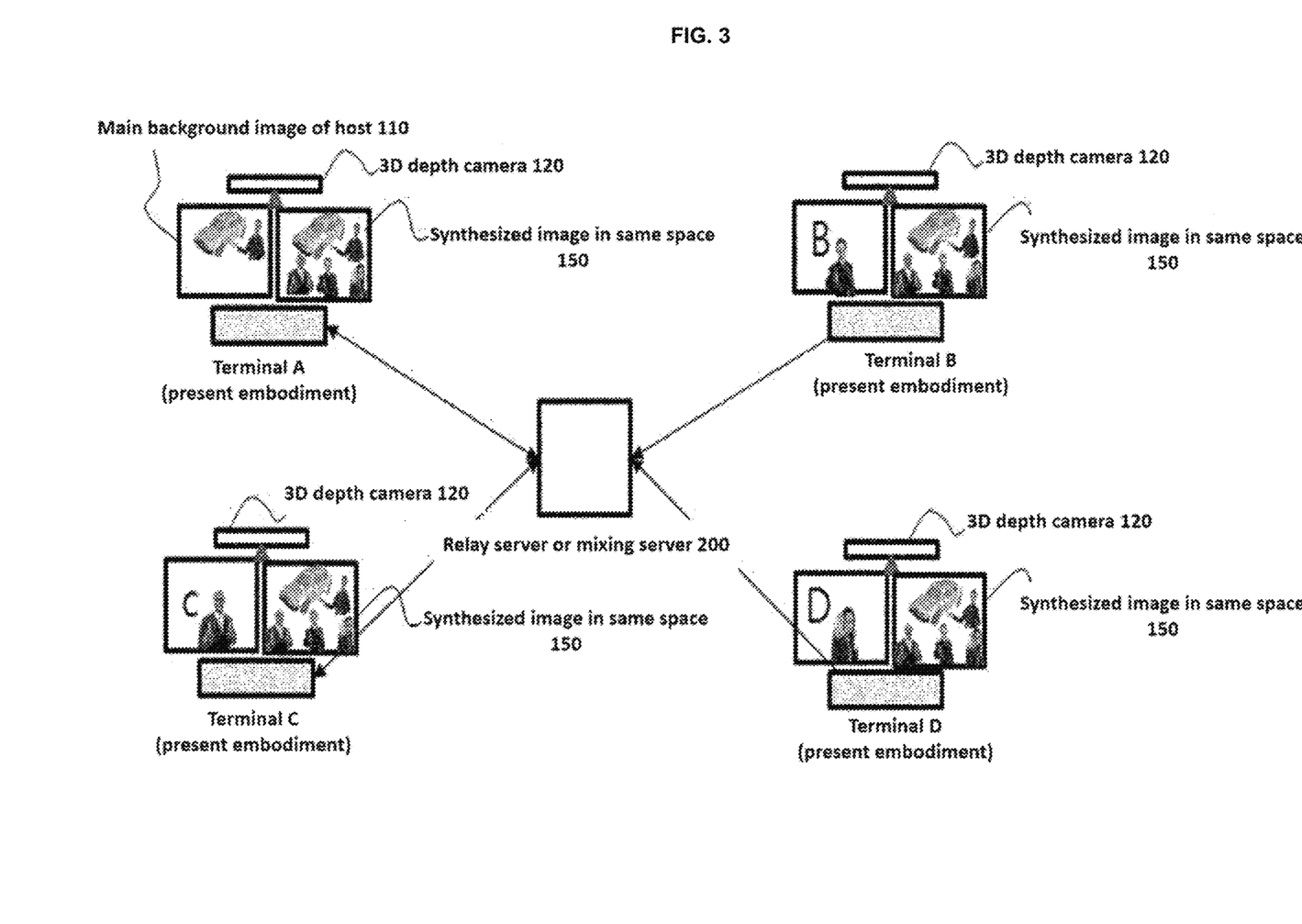

FIG. 3 illustrates another example in a process of video conferencing using a bi-directional VR system according to an exemplary embodiment of the present invention. That is, FIG. 3 illustrates a process of controlling an interactive content, with respect to a video conferencing where all of the terminals are provided with a configuration of the bi-directional VR system according to the exemplary embodiment of the present invention.

First, resolution (first resolution) with respect to the display 1 (110) of the terminal A mounted with the 3D depth camera 120 is checked.

Next, an entire screen of the display 1 (110), on which an extracted transmitter image is positioned, is captured in real-time by the terminal A acquiring a control right of the video conferencing, after which the captured entire screen thereof is encoded into resolution (second resolution) selected as an own image source of the video conferencing, and then is transmitted to a relay server or mixing server 200. Rest of the other terminals B, C, and D are configured to fill backgrounds of images with a solid color (green or blue) according to resolution of respectively extracted images and then transmit the images, the backgrounds of which are filled with the solid color, to the relay server or mixing server 200.

More specifically, with respect to the images of the other terminals B, C, and D except the image of the terminal A acquiring the control right, an image pre-processing module of the relay server or mixing server 200 can eliminate or transparentize respective solid colored backgrounds thereof according to a general image processing method.

The relay server or mixing server 200 has a function of setting the image of the terminal A acquiring the control right as a main background, and of appropriately positioning the images of the other terminals B, C, and D, the respective solid colored backgrounds of which are eliminated by the image pre-processing module of the relay server or mixing server 200, within the main background. To this end, when a layout module of the relay server or mixing server 200 is configured to transmit position coordinate information to a mixing module of the relay server or mixing server 200, the mixing module thereof synthesizes data in order to correspond to the position coordinate information and then transmits the data to an encoding module of the relay server or mixing server 200. Furthermore, the encoding module thereof encodes the data and transmits it to a transmission module of the relay server or mixing server 200, thereby transmitting the data to the respective connected terminals A to D or to the relay server. A configuration and a function of the relay server or mixing server 200, which is provided with the image pre-processing module, the layout module, the mixing module, the encoding module, and the like, will be described later with reference to an additional drawing.

Next, the connected terminals A to D on the same session receive and decode the data transmitted from the transmission module thereof, and then render the decoded data at a specific area of a display unit provided to each terminal.

Here, while watching the rendered screen, a host, called a system administrator, can move image positions of other users on the screen to arbitrary positions within the same space background, and also the other users can move the own image positions to arbitrary content positions which belong to the same space background after receiving a permission signal from the host. More specifically, it may be implemented that, when any of the users points an arbitrary position, a pointed coordinate value is transmitted to the layout module of the relay server or mixing server 200, based on which layout information is updated in real-time to be adjusted to the corresponding coordinate value and then is transmitted to the mixing module of the relay server or mixing server 200, after which the updated layout information is accordingly reflected and mixed by the mixing module thereof and then is transmitted to the encoding module of the relay server or mixing server 200. More specifically, the encoding module thereof is configured to encode output data of the mixing module thereof, and the transmission module of the relay server or mixing server 200 is configured to transmit the encoded data outputted from the encoding module thereof to the respective terminals.

The user of the terminal A acquiring the control right, that is to say the right of managing the operation of the video conferencing, can grant the control-sharing right to the connected terminal B, which is arbitrarily selected amongst the connected users, that is to say the connected terminals.

The connected terminal B, which is granted the control-sharing right, moves a mouse pointer, that is to say a mouse focus, on an area of a display unit 150 on which a synthesized image in the same space is displayed, after which an event can be generated by using devices such as a mouse, a keyboard, a pen mouse, and the like, all of which are capable of generating a similar pointer-event, and the connected terminal B captures the event.

The connected terminal B is configured to convert a coordinate value of a mouse event according to image resolution (second resolution) of the terminal A which is directly received from the terminal A, or received via the relay server or the mixing server 200 by which the image of the terminal A is relayed. It is because that the image of the terminal A of the second resolution may be rendered to a size different from a screen size of the connected terminal B.

The connected terminal B may transmit the converted coordinate value of the mouse event, a captured mouse event, and a keyboard event data, all of which are adjusted to protocol characteristics, to the terminal A, or the relay server or the mixing server 200.

Afterwards, the terminal A checks whether or not control data which is directly received from the terminal A or received via the relay server or mixing server 200 is correct, after which when the received control data is correct, the terminal A converts the received coordinate value of the mouse event to adapt resolution (first resolution) of the display 1 (110) and then focuses the converted coordinate value of the mouse event on the display 1 (110), based on which the received mouse event and/or the keyboard event are/is generated by the terminal A. As described above, the aforementioned conversion process is required because other terminals may select resolution different from the resolution of the display 1 and may perform encoding.

When a status change occurs at an interactive content of the display 1 (110) of the terminal A according to the corresponding event, all of the other connected terminals C and D including the connected terminal B, which is granted the control-sharing right, are able to make sure that a background content of the terminal A in the same background space, which is generated by the connected terminal B, is being changed in real-time.

Additionally, when the connected terminals B, C, and D change their own image positions by virtue of appropriate user interfaces such as pointing, drag and drop, and the like, pieces of the corresponding coordinate information are transmitted to the layout module of the relay server or mixing server 200, such that a mixing process performed by the mixing module thereof is updated in real time to be adjusted to the corresponding positions, after which output data of the mixing module thereof is encoded by the encoding module of the relay server or mixing server 200 and the encoded data is transmitted to the respective terminals by virtue of the transmission module of the relay server or mixing server 200, thereby making it possible for the respective terminals to ultimately receive media data equally processed with respect to the same virtual space.

Figure 4:
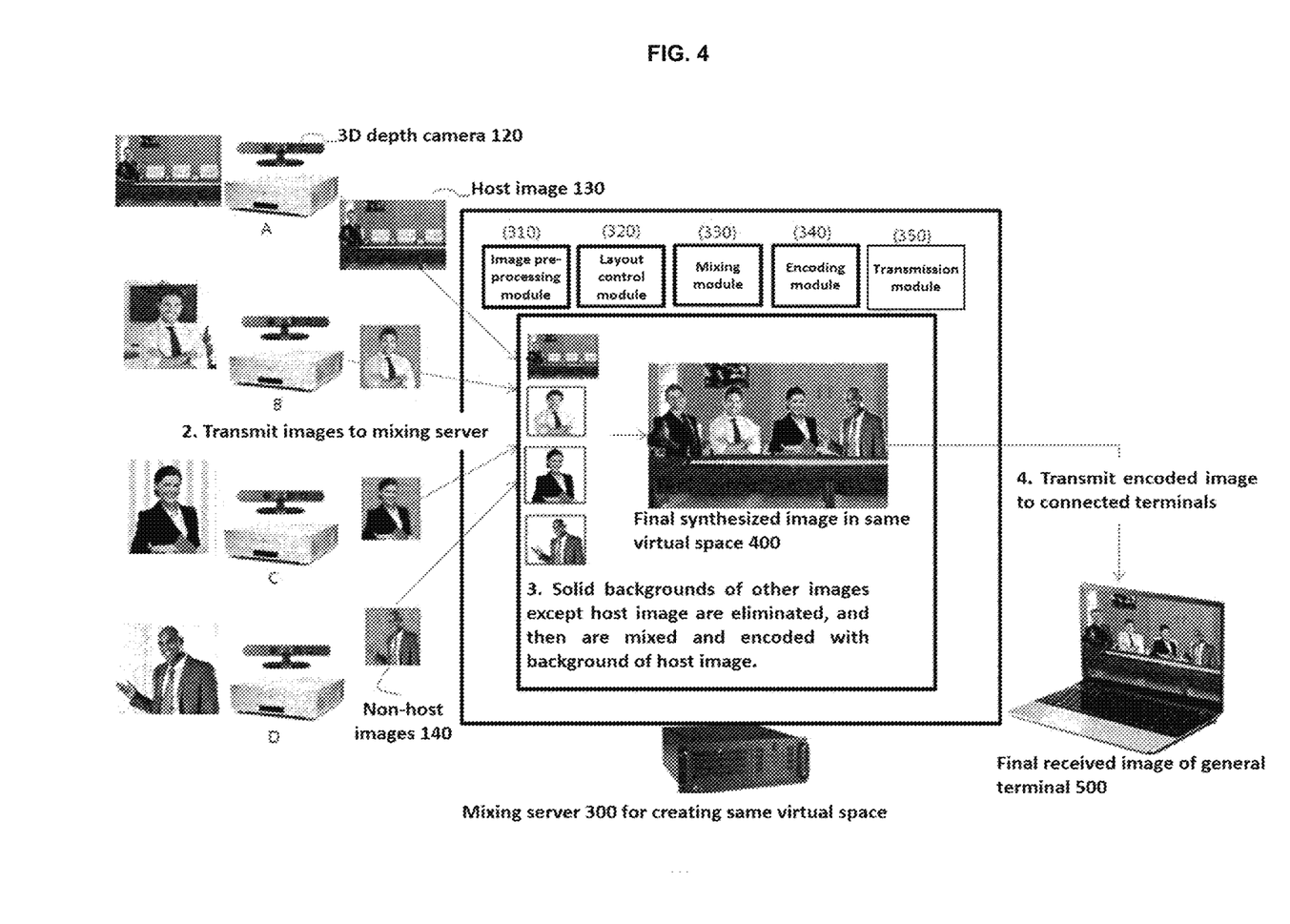

FIG. 4 illustrates a configuration of a bi-directional VR system according to an exemplary embodiment of the present invention. As shown in FIG. 3, FIG. 4 illustrates a configuration of a mixing server for creating the same virtual space more in detail, with respect to a case where all of the terminals in a video conferencing session are composed of terminals using the bi-directional VR system according to the exemplary embodiment of the present invention, Referring to FIG. 4, after images of the respective transmitters A, B, C, and D are extracted by the 3D depth camera 120, a host transmitter (terminal A) is positioned on a screen of the display 1 and performs a real-time capture 130 with respect to an entire screen, based on which encoding process is performed. Furthermore, rest of the transmitters (terminals B, C, and D) are configured to encode images 140, all of which are filled with a solid color (green or blue) according to respective resolution provided to the terminals B, C, and D.

The encoded images of the respective terminals A, B, C, and D are transmitted to a mixing server 300 for creating the same virtual space. As shown in FIG. 4, the mixing server 300 may be provided with an image pre-processing module 310, a layout control module 320, a mixing module 330, an encoding module 340, a transmission module 350, and the like.

In this case, the mixing server 300 for creating the same virtual space performs a function of eliminating or transparentizing solid backgrounds of other images, that is to say the terminals B, C, and D except a host image, that is to say an image of the terminal A, by virtue of the image pre-processing module 310. Next, the host image is used as a main background, and the other images based on the main background of the host (terminal A) are controlled by the layout control module 320 and are appropriately positioned by the mixing module 330, after which output data of the mixing module 330, where all of the images are appropriately positioned by the mixing module 330, is encoded thought the encoding module 340.

Afterwards, the transmission module 350 is configured to transmit the encoded image to the respective terminals or a relay server, so that general terminals 500 not provided with a camera are able to receive media streaming through the relay server without intercommunication.

Figure 5:
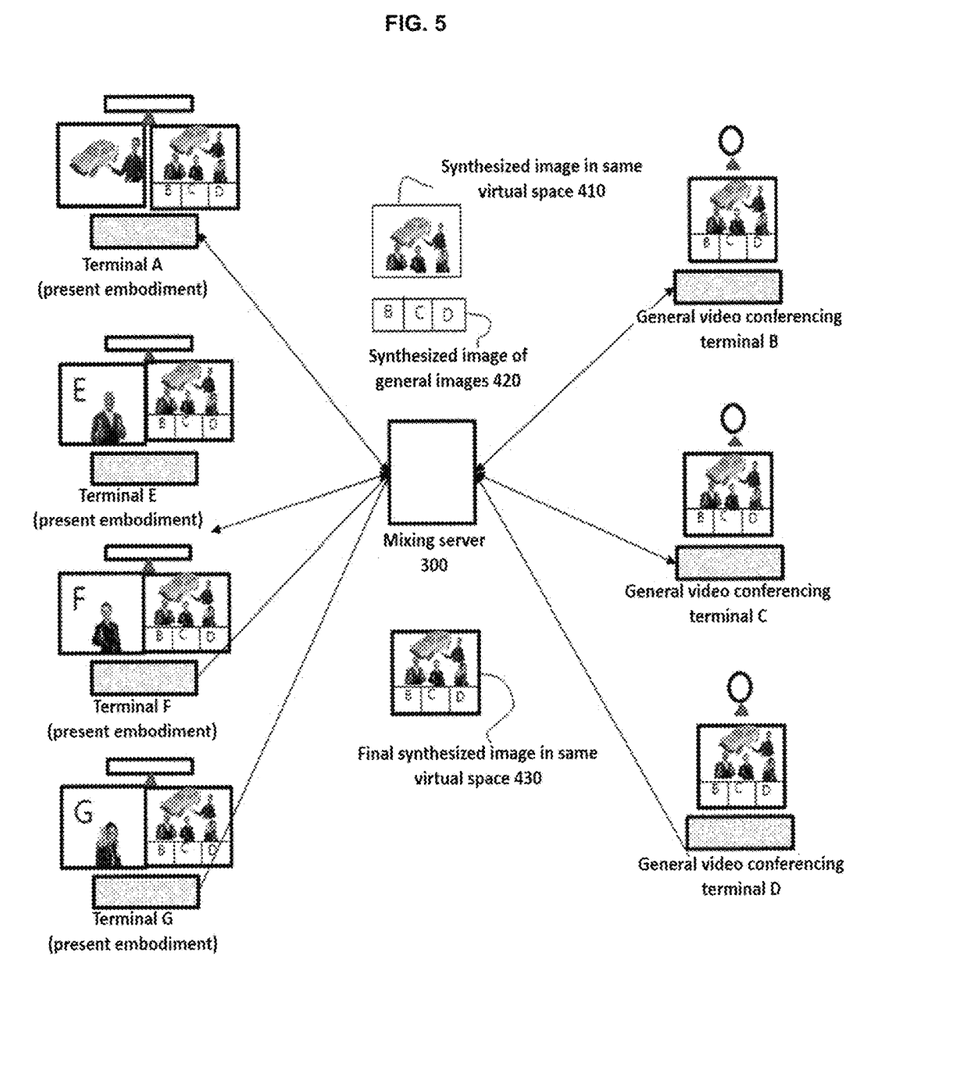

FIG. 5 illustrates a configuration of a bi-directional VR system according to an exemplary embodiment of the present invention, and also describing a case where terminals using the bi-directional VR system according to the exemplary embodiment of the present invention and other terminals mounted with the 2D camera coexist in a video conferencing session.

That is, FIG. 5 shows a mixed mode with respect to the exemplary embodiments of FIGS. 2 and 3.

Referring to FIG. 5, respective terminals A, E, F, and G according to the exemplary embodiment of the present invention are configured with the 3D depth camera and a dual display, and other terminals B, C, and D are mounted with the 2D camera.

Accordingly, when all of the terminals herein are configured to be connected to the same session, characteristics with respect to the respective terminals are configured to be transmitted to the mixing server 300 before being connecting thereto, after which the terminals A, E, F, and G are processed to be in the same virtual space by a layout module of the mixing server 300 such that a synthesized image in the same virtual space 410 is separately generated. Next, the synthesized image in the same virtual space 410 and a synthesized image of general images 420 with respect to the other terminals B, C, and D are assorted and are ultimately provided as a final synthesized image in the same virtual space 430, thereby transmitting the final synthesized image in the same virtual space 430 to the respective terminals according to the method and process described hereinabove and making it possible to perform intercommunication therebetween.

The configurations and operations of the bi-directional VR system according to exemplary embodiments of the present invention are entirely summarized as follows.

First, so as to configure a main terminal, two sound devices, an interface of which is configured with an audio output terminal and a microphone terminal, are installed in a computer such as a PC, after which the audio output terminal of a first sound device is connected to a first input terminal of a mixer device provided with a plurality of channels by using an audio cable and the microphone terminal is connected to a second input terminal of the mixer device. Furthermore, an output terminal of the mixer device is connected to a microphone terminal of a second sound device by using an audio cable, thereby having an effect of transmitting a voice of a content transmitter and a content sound of a video, and the like without howling.

Next, the PC is booted and respective displays are connected therebetween by selecting "Extend these displays" in the multiple display option, based on which a first display unit is configured to display wallpaper, that is to say a background image, and a second display unit is configured to display a broadcasting service or a video conferencing program, and the like.

In this case, a user image is extracted by using the 3D depth camera, that is to say extracted data of a user image is acquired through the 3D depth camera, after which the user image is configured to be displayed on the first display unit. Accordingly, the content transmitter is able to transmit an interactive content together with own image data by using the first display unit, while watching other users of the video conferencing, and the like through the second display unit.

Afterwards, a real-time captured image with respect to an entire screen of the first display unit is transmitted together with mixed data composed of a content sound and a user voice to the mixing server, thereby having an effect of transmitting a more stereoscopic and realistic content to respective users. A similar method may be applied to the broadcasting service.

Next, a sound device for playing media player software installed in the PC is selected as the first sound device, and a device for playing a sound of the broadcasting service or the video conferencing program, and the like, or a device for a microphone is selected as the second sound device, thereby having an effect of transmitting the content sound of the video and the voice of the content transmitter without howling.

Furthermore, when connected users using a general terminal mounted with the 2D camera, and the like exist on the same session, one of the connected users is arbitrarily selected and is granted a control right, that is to say a right of managing the operation of the video conferencing, thereby accomplishing bi-directional virtual reality in which an interactive background image of the main terminal is able to be controlled together with image communication.

Meanwhile, in a case where terminal devices having the same configurations as that of the main terminal are plurally connected, user images extracted from other terminals and a transmitter image of a virtual space are positioned in the same interactive virtual space background, thereby making it possible to interact with a background content and to move a position within the same virtual space, and thus having an advantage of providing a high sense of realism, that is to say a sense of coexisting in the same virtual space.

To this end, when a plurality of the terminals are connected on the same session, one of the terminals is arbitrarily selected as a host, called a system administrator, in accordance with an accepted policy, after which an interactive background content and an extracted host image are synthesized by the arbitrarily selected terminal according to the aforementioned method, and then the synthesized image is transmitted to a mixing server. Afterwards, as described hereinabove, rest of the other terminals B, C, and D are configured to fill backgrounds of images with a solid color (green or blue) and then transfer the images to the mixing server.

The exemplary embodiments of the present invention, which are described with reference to the drawings, are mostly described with respect to the video conferencing. However, the system of the present invention should not be construed as being limited to the video conferencing, and, as mentioned above, may be applied not only to bi-directional distance education and entertainment requiring bi-directional event relays such as a cyber model house, and the like, but also to various areas such as public sectors including a bi-directional seminar relay and disaster countermeasures, bi-directional home shopping, an internet broadcasting service, and the like.

As described above, the present invention should not be construed as being limited to the above-mentioned exemplary embodiments and the accompanying drawings, however, on the contrary, it is intended to cover various modifications and and equivalent arrangements included within the spirit and scope of the appended claims.

What is claimed is:

1. A bi-directional virtual reality (VR) system, comprising:
    two or more terminals; and
    a mixing server configured to transmit mixed data generated by processing signals transmitted from the terminals to the respective terminals,
    wherein at least one main terminal of the two or more terminals includes:
        a 3D depth camera;
        a main body unit provided with a processor and a memory, and loaded with an operation program;
        at least two sound devices connected to the main body unit to be controlled by the main body unit, and provided with an audio output terminal and a microphone terminal; and
        at least two display units connected to the main body unit to be controlled by the main body unit,
    wherein the display units are respectively configured in a manner that a first display unit displays wallpaper and a second display unit displays a virtual reality application program;
        the first display unit is configured to display extracted data of a user image which is acquired through the 3D depth camera; and
    the second display unit is configured to display the mixed data.

2. The bi-directional VR system according to claim 1, wherein the sound devices are configured in such a manner that an audio output terminal of a first sound device is connected to a first input terminal of a mixer device provided with a plurality of channels; a microphone terminal is connected to a second input terminal of the mixer device; and an output terminal of the mixer device is connected to a microphone terminal of a second sound device.

3. The bi-directional VR system according to claim 1, wherein the main terminal is configured to transmit mixed data composed of a content sound and a user voice, and a real-time captured image with respect to an entire screen of the first display unit to the mixing server.

4. The bi-directional VR system according to claim 3, wherein the main terminal is capable of granting a control-sharing right to an arbitrarily selected terminal.

5. The bi-directional VR system according to claim 4, wherein the arbitrarily selected terminal which is granted the control-sharing right is configured to perform a coordinate conversion process by which image data transmitted from the mixing server is converted in order to correspond to image resolution of the main terminal.

6. The bi-directional VR system according to claim 1, wherein the mixing server includes:
    an image pre-processing module configured to perform pre-processing with respect to image data transmitted from the respective terminals;
    a layout control module configured to control a layout with respect to image data pre-processed through the image pre-processing module; and
    a mixing module configured to mix and position data in which the layout is controlled through the layout control module.

7. The bi-directional VR system according to claim 6, wherein the mixing server further includes:
    an encoding module configured to encode output data of the mixing module; and a transmission module configured to transmit encoded data outputted from the encoding module to the respective terminals.

8. The bi-directional VR system according to claim 7, further comprising a relay server configured to transmit mixed data generated by the mixing server to a streaming receiving terminal.

9. The bi-directional VR system according to claim 8, wherein the relay server is configured to receive the mixed data of the mixing server from the transmission module.

10. The bi-directional VR system according to claim 2, wherein the mixing server includes:
    an image pre-processing module configured to perform pre-processing with respect to image data transmitted from the respective terminals;
    a layout control module configured to control a layout with respect to image data pre-processed through the image pre-processing module; and
    a mixing module configured to mix and position data in which the layout is controlled through the layout control module.

11. The bi-directional VR system according to claim 3, wherein the mixing server includes:
    an image pre-processing module configured to perform pre-processing with respect to image data transmitted from the respective terminals;
    a layout control module configured to control a layout with respect to image data pre-processed through the image pre-processing module; and
    a mixing module configured to mix and position data in which the layout is controlled through the layout control module.

12. The bi-directional VR system according to claim 4, wherein the mixing server includes:
    an image pre-processing module configured to perform pre-processing with respect to image data transmitted from the respective terminals;
    a layout control module configured to control a layout with respect to image data pre-processed through the image pre-processing module; and
    a mixing module configured to mix and position data in which the layout is controlled through the layout control module.

13. The bi-directional VR system according to claim 5, wherein the mixing server includes:
an image pre-processing module configured to perform pre-processing with respect to image data transmitted from the respective terminals;
a layout control module configured to control a layout with respect to image data pre-processed through the image pre-processing module; and
a mixing module configured to mix and position data in which the layout is controlled through the layout control module.

* * * * *